INVENTOR
JOHN L. HEINLEIN
BY Greist, Lockwood, Greenawalt & Dewey
ATT'YS.

June 20, 1967  J. L. HEINLEIN  3,326,352
BALE THROWER
Filed June 22, 1966  3 Sheets-Sheet 3
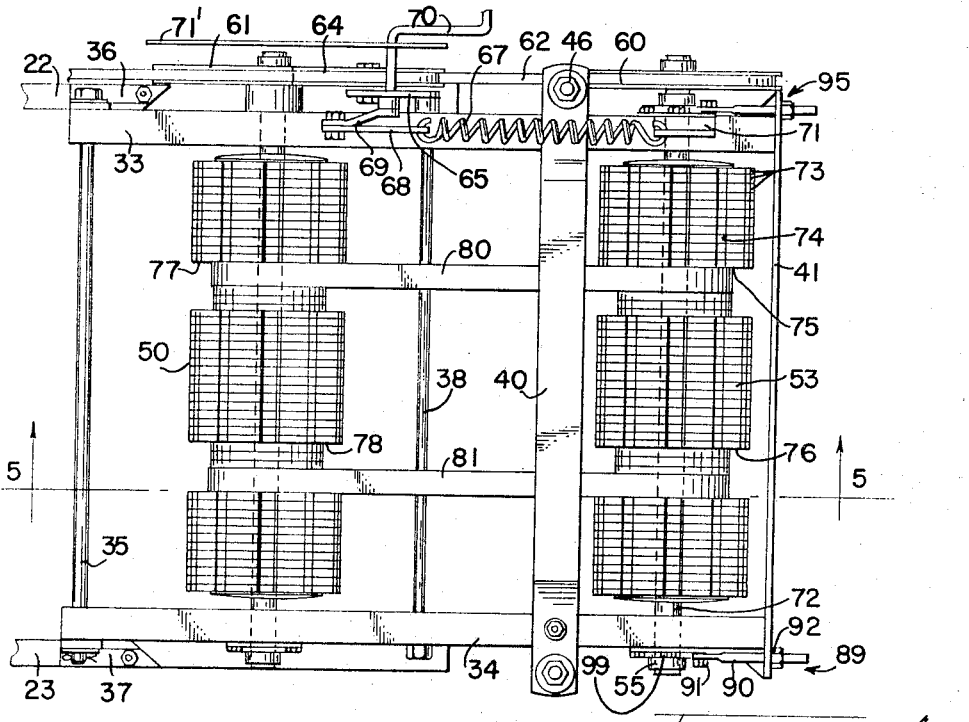
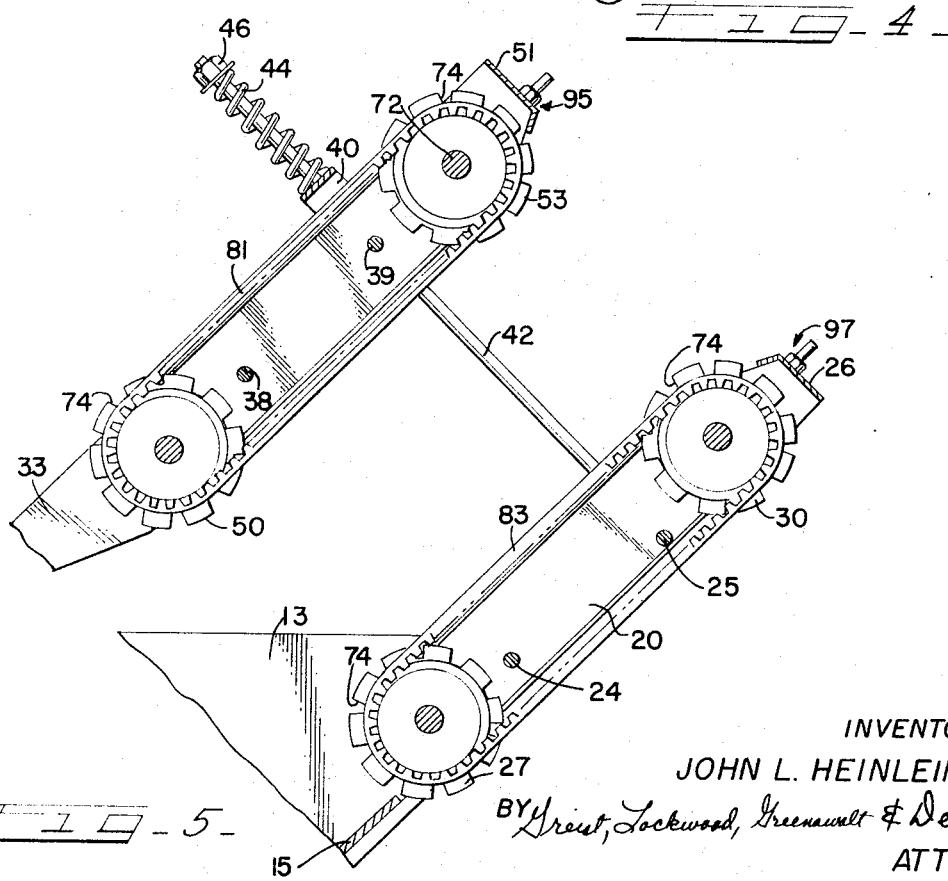
INVENTOR
JOHN L. HEINLEIN
BY Trent, Lockwood, Greenawalt & Dewey
ATT'YS.

United States Patent Office 3,326,352
Patented June 20, 1967

3,326,352
BALE THROWER
John L. Heinlein, Shelbyville, Ill., assignor to Oliver Corporation, Chicago, Ill., a corporation of Delaware
Filed June 22, 1966, Ser. No. 559,571
3 Claims. (Cl. 198—128)

This invention relates to improvements in bale throwers and more specifically is directed to a new and improved bale thrower adapted for throwing bales of standard length as well as those of short length.

Bale throwers have been found to be very useful to reduce the labor required in the haying operation. Types of bale throwers which have been most popular may be classified in two broad categories, these being the "kicker-type" and the "conveyor-type." A typical example of the former type may be found in the patent to Morrison et al, No. 2,756,865. The "conveyor-type" may be further broken down into two categories, these being the belt-type and the roller-type. Examples of these types may be found in the patents to Smoker et al., Patent No. 3,132,754, and Muehlhausen, Patent No. 3,198,356.

The belt-type of bale thrower provides certain advantages in that it is capable of handling bales of any practical length, and has good operational characteristics over a wide range of bale sizes. Certain disadvantages have been attributed to the belt-type roller by the proponents of the roller-type of bale thrower. These are the increased cost, and poor performance under certain conditions due to the slippage between the belt and driving pulley, and the slippage of the hay on the belt. In addition, the contact of the binding on the baled material with the belt causes grooves to be cut in the belt causing subsequent breaking necessitating replacement. Tracking of the belts is also alleged to be a problem in belt-type bale throwers.

The roller-type of bale thrower is considered to have certain disadvantages also. Each of the individual rollers must be driven requiring a pulley on each and a rather long double V-belt. Since the baled material is soft and the bale somewhat flexible, there is also a tendency for the bale to curl as it moves between the rollers, resulting in inexact alignment with the succeeding rollers. In addition, the length of bale handled by a roller-type bale thrower is generally limited to standard size bales. With short bale lengths becoming increasingly popular, it is necessary to obviate this disadvantage if at all possible.

The bale thrower of the present invention is of greatly simplified construction when compared with the other conveyor-type of bale throwers. This simplification results in an appreciable reduction in the manufacturing cost and yet the advantages of both of the known conveyor types are retained while eliminating the disadvantages of each. For example, the bale thrower of the present invention can handle bales of any size including those of standard length. Operationally speaking, in throwing short length bales of light hay, it will out-perform the roller-type while performing as well with standard length bales. As noted above, the proponents of the roller-type bale thrower represent that it will out-perform the belt type. The present bale thrower provides good performance under varying crop conditions and bale sizes and has been found to be quite satisfactory in actual use.

The bale thrower of the present invention includes upper and lower frame members which are mounted in spaced relation to each other. The lower frame member is fixed while the upper frame member may be mounted for pivoting movement relative to the lower frame member to compensate for any variations in the thickness of the bale ejected. Suitable means is provided to bias the upper frame member towards the lower frame member to a limited extent to cause a squeezing action on the bale and maintain good driving engagement between a pair of spaced rollers mounted in each of the frame members. The lowermost roller in each of the frame members is driven through a belt and pulley arrangement and consists of a cleated roller construction adapted to grip the bale and impart motion to the same. The upper roller in each frame is identical in construction to the lower roller, however, is supported for free rotation in a pair of spaced bearings mounted on the frame member. The bearings mounting the upper rollers on the associated frame members are movable to permit the axis of rotation of the roller to be moved or adjusted for reasons to become apparent.

Each of the rollers is provided with at least two annular groves formed inwardly of the opposite ends and in spaced relation to each other. In each of these grooves is positioned a narrow belt of conventional design which interconnects the driven lower roller with the freely rotatable upper roller to impart motion to the same and provide a continuous support for the bales as they move between the rollers. The belt thickness is equal to or less than the groove depth to position the surface of the belt below the driving surface of the roller so as to not interfere with the driving action of the roller on the bale. Such location of the belts minimizes the chances of the belt being contacted and torn by the binding on the bale, as it will almost be moving at the same velocity when the belts are engaged. The belts also serve to support and guide the bale between the rollers and may act on the bales to assist in acceleration, however, the principal impetus given to the bale during ejection is provided by the cleated rollers. The belt guiding of the bales serves to prevent curling of the bales assuring that they are aligned when entering the upper rollers preventing loss of dynamic energy. Adjustment of the tension on the belts is provided by the movable bearing mountings mentioned above, however, tension adjustment is not required with any great frequency because of the novel relation between the belt and roller.

Substantial benefits are derived from the novel bale thrower construction which are not obtainable with the prior art devices discussed briefly above. These benefits and additional advantages will become apparent upon a consideration of the objects achieved and a detailed description of a preferred embodiment.

It is therefore an object of this invention to provide a new and improved bale thrower particularly adapted for ejecting bales of any length including short length bales.

It is a further object of this invention to provide a new and improved bale thrower construction which is greatly simplified when compared with the prior art and which provides advantages in manufacture and assembly as well as improved operational performance.

It is a further object of this invention to provide a new and improved bale thrower which due to the reduced number of parts is less expensive than prior art conveyor types while providing good operational characteristics.

It is a still further object of this invention to provide a bale thrower which trajects bales by means of the combined action of belts and rollers.

It is a still further object of this invention to provide a bale thrower which combines the advantages of the prior art roller types and belt types while avoiding the disadvantages of these types.

Additional objects other than those specifically enumerated will become evident on consideration of the accompanying drawings and following description.

In the drawings:

3

FIG. 4 is a top plan view taken generally along the lines 4—4 of FIG. 2; and

FIG. 5 is a cross sectional view taken generally along the lines 5—5 of FIG. 4 with the drive pulleys, belt, and idler omitted for clarity.

Figure 1:
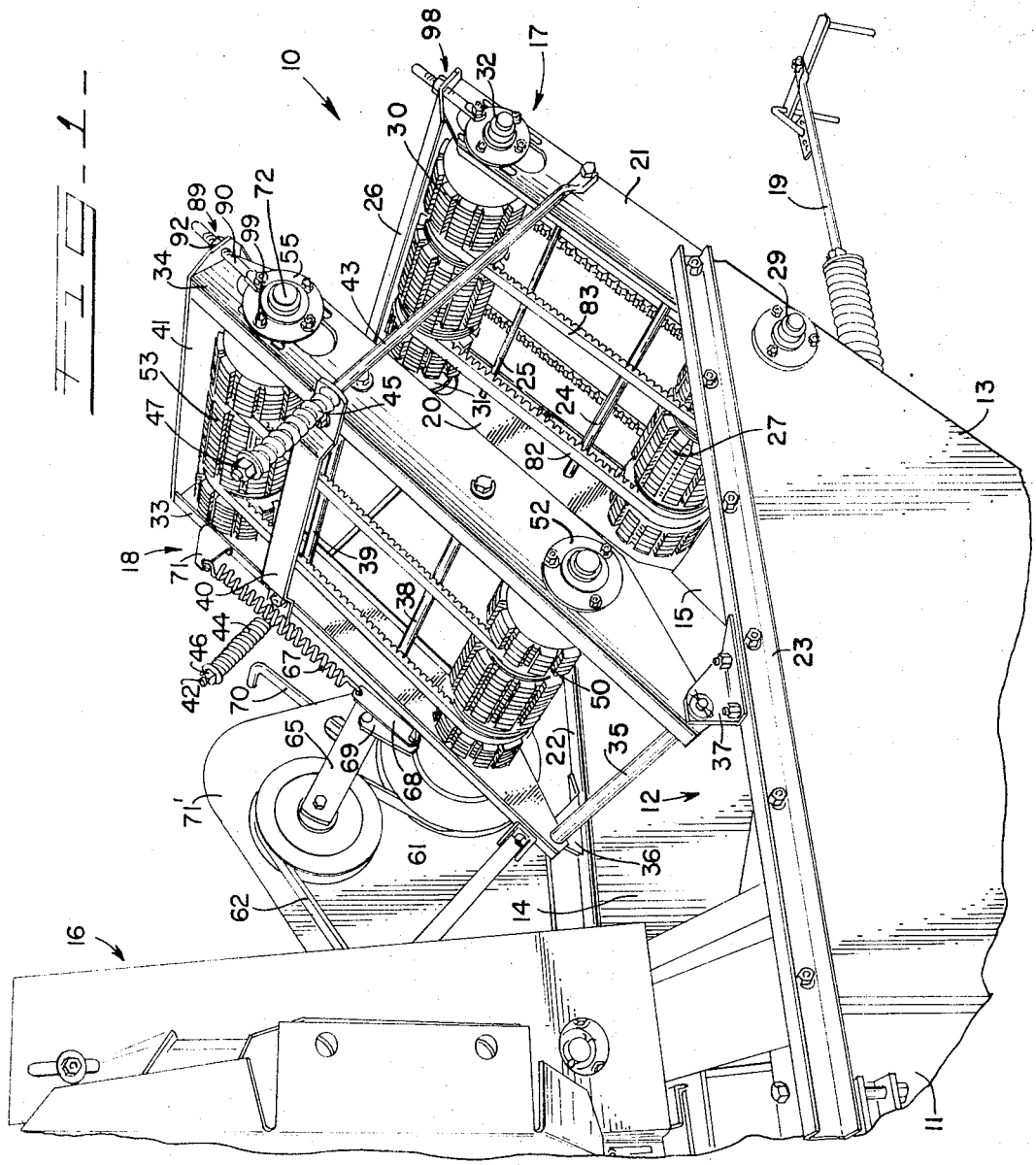
FIG. 1 is a fragmentary top and side perspective view of the bale thrower of the present invention.

Referring now to FIG. 1, a bale thrower is shown generally at 10 which is adapted for pivoting attachment to the discharge end of a baler 11. The bale thrower 10 includes a bale receiving chamber 12 formed by spaced side plates 13 and 14. A bottom wall portion 15 joins the plates 13 and 14 and is sloped at its rearward end to guide the bales for discharge from the bale receiving chamber into the bale thrower. A follower tongue 19 of the type shown in Patent No. 3,090,509 maintains the bale thrower 10 aligned with a trailing wagon (not shown) which is adapted to receive the bales.

Power for the bale thrower may be provided by any suitable means, and in the embodiment of the invention illustrated, mechanical power is provided through a unique belt drive arrangement indicated generally at 16, the details of which are described in Patent No. 3,235,061, assigned to the assignee of the present invention. The belt drive arrangement 16 transfers power from the baler or power take-off of the tractor directly to the pivotally mounted bale thrower 10.

The bale thrower 10 includes a lower roller assembly indicated generally at 17 and an upper roller assembly indicated at 18. The lower roller assembly includes spaced frame members 20 and 21 which are rigidly joined to stiffener members 22 and 23 at the top of the side plates 13 and 14. The frame members 20 and 21 may be also joined directly to the side plates by fasteners, welding or any suitable means. A pair of rod-like cross braces 24 and 25 maintain the central portion of the frame members 20 and 21 in parallelism, while an end brace 26 provides transverse rigidity at the outer end. A lower roller 27 is journaled in flanged bearings 28 and 29 (only 29 illustrated in FIG. 1). An upper roller 30 is journaled for rotation in flanged bearings 31 and 32 mounted in the frame members 20 and 21, respectively. The flange bearings 31 and 32 mounting the upper roller 30 are adjustably mounted to permit shifting of the axis about which the roller rotates for reasons to become apparent.

The upper roller assembly 18 includes spaced frame members 33 and 34 pivotally mounted at their lower end by means of a shaft 35 joined to fixed brackets 36 and 37 mounted on the stiffener members 22 and 23 respectively. This permits pivoting movement of the upper roller assembly 18 relative to the lower roller assembly 17. The intermediate portion of the frame members are held in rigid spaced parallel relation by means of transverse rod-like braces 38 and 39 and a plate-like brace 40. An end brace 41 joins the outer ends of the frame members 33 and 34 and is similar in construction to the end brace 26, both of which have end portions projecting beyond the sides of the associated frame members.

The plate-like brace 40 has opposite ends projecting beyond the sides of the frame members 33 and 34 which are apertured to receive shouldered support rods 42 and 43 limiting movement of the upper roller assembly 18 towards the lower roller assembly 17. Upward pivoting movement of the upper roller assembly about the axis formed by the shaft 35 is limited and resiliently resisted by means of coil springs 44 and 45 held to the rods 42 and 43 by means of a nut and washer assembly 46 and 47 respectively.

The upper roller assembly includes a lower roller 50

4 which is mounted for rotation in flanged bearings 51 and 52 (only bearing 52 shown in FIG. 1). An upper roller 53 is mounted in a manner identical to the upper roller 30 on the lower roller assembly 17, being supported by flanged bearings 54 and 55 (only bearing 55 shown in FIG. 1) adjustably carried on the frame members 33 and 34, respectively.

Figure 2:
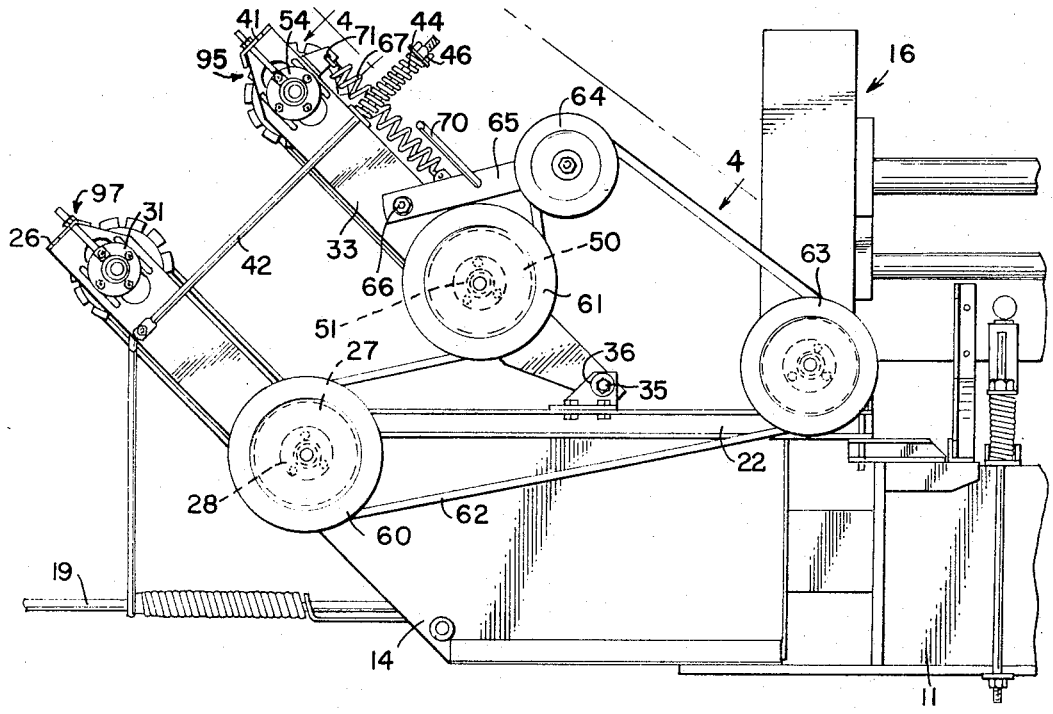
FIG. 2 is a side elevational view of the bale thrower shown in FIG. 1 illustrating the mode of driving the rollers.
Figure 3:
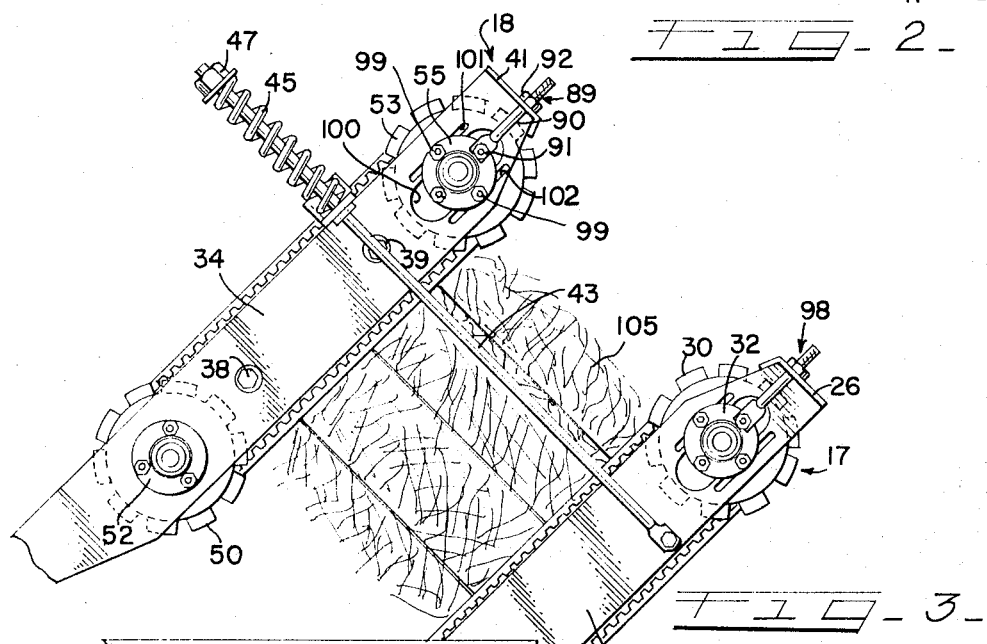
FIG. 3 is a fragmentary side elevational view similar to FIG. 2 illustrating the bale thrower in the act of ejecting a short length bale.

As seen in FIG. 2, lower rollers 27 and 50 are driven through pulleys 60 and 61 having an endless belt 62 extending around the same. A drive pulley 63 driven by the belt drive assembly 16 serves to transfer the power from the belt drive assembly 16 through the endless belt 62 to drive the individual rollers 27 and 50. Adequate tension is maintained on the belt 62 by means of an idler pulley 64 mounted on an arm 65 pivotally joined by a pin 66 to the frame 33, and biased by a spring 67.

As is apparent in FIG. 1, one end of the spring 67 is joined to the arm 65 by a pair of links 68 and 69, while the opposite end is joined to a fixed bracket 71 mounted on the frame member 33. A handle 70 shown in FIGS. 1 and 4, permits the tension on the spring 67 to be released by rotating links 68 and 69. This releases the tension on the arm 65 with a subsequent loosening of the endless belt 62 permitting slipping over the pulleys 60 and 61 on the rollers 27 and 50 respectively. A shield 71' covers the driving pulleys and endless belt 62 to provide operator safety as well as protection against foreign material getting into the belt drive.

Referring now to FIGS. 1 and 3-5, it can be observed that the upper and lower rollers on each of the roller assemblies 17 and 18 is driven by a pair of spaced apart belts. Inasmuch as the rollers are of identical construction, detailed description will be limited to the roller 53 which includes a support shaft 72 journaled in the bearings 54 and 55, and on which a series of laminations 73 are mounted. The laminations 73 may be formed of elastomer and cord such as is found in the conventional automobile tire. The roller is longitudinally grooved or notched as at 74 to provide a cleated roller construction which is well known in the art. A pair of belt receiving grooves 75 and 76 are formed in the roller 53 intermediate the ends, however, they are inspaced relation to each other. The lower roller 50 is of similar construction being provided with belt grooves 77 and 78 receiving belts 80 and 81 joining rollers. Identical belts 82 and 83 (FIG. 1) join similar grooves formed in the rollers 27 and 30. As best seen in FIG. 5, each of the belts is provided with teeth along the inner periphery to maintain the pitch line of the belt properly located as it moves around the rollers, causing the lower roller to drive the upper roller on each of the respective rollers assemblies 17 and 18. As is evident from FIG. 5, the outer surface of each of the belts is positioned well below the outer circumference of the associated roller for reasons to become apparent when the operation of the bale thrower is given.

Tension on the belts requires relatively infrequent attention because the lower rollers provide the principal means to accelerate the bales to approximately their final velocity. However, from time to time due to the changing conditions and slight stretch in the belts, minor adjustments may be necessary. Such adjustment is facilitated by shifting the axis of rotation of each of the upper rollers through shifting the supporting bearings. As the adjustment is identical for all bearings, only the adjustment of the bearing 55 will be described in detail. An adjusting means 89 includes an eye bolt 90 joined to the bearing 55 by means of a bolt 91. The threaded end of the eye bolt 90 receives a nut 92 acting against the end brace 41. Since the end braces 26 and 41 project beyond the sides of the associated frame members, adequate clearance is provided to accommodate the threaded end of the bolt 90. Similar adjusting means is provided at the opposite end of the roller 53, being represented generally by reference character 95. The upper roller 30 on the lower roller assembly 17 is provided with like adjusting means at 97 and 98.

In order to adjust the position of the bearing 55, the fasteners 99 are backed off a few turns. The nut 92 may then be rotated sliding the bearing up the slot 100 while fasteners 99 slide in the slots 101 and 102 until adequate belt tension is obtained. Similar adjustments of the other bearings are effected by the adjusting means 95, 97 and 98. When proper roller alignment and requisite tension on the belt is obtained, the fasteners holding each of the bearings to the frame members may then be drawn up tight to clamp the bearing in position and help hold the end of the associated roller properly located.

In operation, bales are compacted in the baler, tied and pushed from the bale case 11 into the bale receiving chamber formed by the plates 13 and 14 and bottom plate 15. The following baled material pushes the preceding bale into engagement with the lower rollers 27 and 50. The cleated portion of these rollers catch the surface of the bale and accelerate the bale. In the case of the short bale shown at 105 in FIG. 3, once the bale leaves the lower roller members its momentum and the drive provided by the narrow belts cause it to move to the upper rollers 30 and 53 which serve to further increase or at least maintain its speed for ejection into a trailing wagon. The narrow belts guide the bale 105 between the rollers, keeping it properly aligned as it enters the space between the upper rollers 30 and 53 for maximum efficiency in trajection. In the case of short bales, if the narrow belts were omitted, the bale would fall between the rollers or become jammed.

From the foregoing, it can be appreciated that the bale thrower of the present invention is far less complex than prior art types, yet provides operational advantages in that it may be used with bales of all practical sizes. Considerable cost saving is realized in the manufacture of the present design with such savings directly attributable to the novel features set out above, making the present device economically attractive to the purchaser.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. A bale thrower adapted to traject bales of material received from a baling machine into a trailing wagon, said bale thrower comprising an upper roller assembly and a lower roller assembly, said lower roller assembly consisting of a pair of spaced side frame members, bearing means mounting first and second rollers for rotation in said spaced frame members, one of said first and second rollers having a driving means associated therewith to permit application of rotational motion to said one of said first and second rollers, said one of said first and second rollers having the driving means associated therewith being operatively interconnected to the other of said first and second rollers by a pair of narrow belts, each of said narrow belts joining said first and second rollers being located in an aligned groove formed in each of said first and second rollers inwardly of the ends thereof thereby permitting both of said rollers and said narrow belts to drivingly engage said bales, said upper roller assembly including spaced frame members positioned above said lower roller assembly, bearing means mounting third and fourth rollers for rotation in said upper frame members, one of said third and fourth rollers having a driving means associated therewith to permit application of rotational motion to one of said third and fourth rollers, said one of said third and fourth rollers having the driving means associated therewith being joined to the other of said third and fourth rollers through a pair of narrow belts, each of said narrow belts joining said third and fourth rollers being located in grooves formed in said third and fourth rollers inwardly of the ends thereof thereby permitting said rollers and said narrow belts to drivingly engage said bales, said narrow belts on each of said roller assemblies being of lesser thickness than the depth of the belt receiving groove in said roller thereby to position the bale engageable surface of said belt below the surface of said roller to permit said rollers to drivingly engage said bale in advance of said belts, said belts being operative to guide said bales between said rollers and provide a drive means for the other of said first and second rollers and the other of said third and fourth rollers on said lower and upper frame assemblies respectively.

2. The bale thrower of claim 1 wherein each of the bearing means mounting each of said rollers driven by said narrow belts is provided with means to permit adjustment of said bearing means longitudinally of said frame thereby permitting adjustment of the tension on said belts.

3. The bale thrower of claim 1 wherein each of said rollers is provided with a cleated circumferential bale engaging surface.

References Cited

UNITED STATES PATENTS

| | | | |
|---|---|---|---|
| 2,490,381 | 12/1949 | Shields | 198—165 X |
| 2,682,216 | 6/1954 | Shields | 198—165 X |
| 2,781,892 | 2/1957 | Thevenieau | 198—208 X |
| 2,808,924 | 10/1957 | Wood | 198—208 |
| 3,095,962 | 7/1963 | Hollyday | 198—128 |
| 3,112,024 | 11/1963 | Lakin | 198—127 |
| 3,168,189 | 2/1965 | Luedtke | 198—128 |

FOREIGN PATENTS 611,499   10/1948   Great Britain.

EVON C. BLUNK, Primary Examiner.

M. L. AJEMAN, Assistant Examiner.